(12) United States Patent  
DeVaux

(10) Patent No.: US 6,481,599 B1  
(45) Date of Patent: Nov. 19, 2002

(54) DENTAL CENTER

(76) Inventor: Robert B. DeVaux, 1044 Pine St., #1A, San Francisco, CA (US) 94109

( * ) Notice: Subject to any disclaimer, the term of this patent is extended or adjusted under 35 U.S.C. 154(b) by 0 days.

(21) Appl. No.: 09/853,411

(22) Filed: May 11, 2001

(51) Int. Cl.$^7$ .................................................. B67D 5/06
(52) U.S. Cl. .................... 222/192; 222/390; 222/181.3; 222/185.1; 222/386
(58) Field of Search .................. 222/192, 390, 222/181.3, 185.1, 386

(56) References Cited

U.S. PATENT DOCUMENTS

| | | | | |
|---|---|---|---|---|
| 811,370 | A | * 1/1906 | Brush | 132/286 |
| 1,451,119 | A | * 4/1923 | Schroeder et al. | 248/108 |
| 1,492,836 | A | * 5/1924 | Decker | 132/314 |
| 1,761,875 | A | 6/1930 | Cordell et al. | |
| 2,294,954 | A | 9/1942 | Brady | |
| 2,699,889 | A | * 1/1955 | Johnson | 222/390 |
| 3,072,297 | A | 1/1963 | Lippman et al. | |
| 3,156,387 | A | * 11/1964 | Harwood | 222/390 |
| 3,946,908 | A | 3/1976 | Yoon | |
| 3,993,226 | A | * 11/1976 | Pavenick | 222/327 |
| 4,020,975 | A | * 5/1977 | Stauffer | 222/93 |
| 4,122,983 | A | 10/1978 | Jolly | |
| 4,203,567 | A | * 5/1980 | Featherstone | 248/108 |
| 4,258,864 | A | 3/1981 | Karamanolis et al. | |
| 4,428,389 | A | * 1/1984 | Sanchez | 132/92 A |
| 4,673,106 | A | * 6/1987 | Fishman | 222/80 |
| 4,793,521 | A | 12/1988 | Steiner | |
| 4,796,783 | A | * 1/1989 | Paulson | 222/80 |
| 4,817,826 | A | * 4/1989 | Judge | 222/192 |
| 4,827,951 | A | 5/1989 | Grussmark | |
| 4,957,125 | A | * 9/1990 | Yaneza | 132/309 |
| 4,991,755 | A | 2/1991 | Grusmark | |
| 5,156,311 | A | * 10/1992 | Spencer, Jr. et al. | 225/41 |
| 5,215,218 | A | 6/1993 | Choi | |
| 5,230,444 | A | 7/1993 | Dunbar | |
| 5,382,106 | A | * 1/1995 | Voigt | 401/155 |
| 5,544,754 | A | * 8/1996 | Stahl | 206/581 |
| 5,573,021 | A | * 11/1996 | Grofcisk et al. | 132/324 |
| 5,638,840 | A | 6/1997 | Lee et al. | |
| 5,676,279 | A | * 10/1997 | Bastion | 222/93 |
| 5,806,666 | A | 9/1998 | Chiang et al. | |
| 5,813,572 | A | * 9/1998 | Kolacek | 222/107 |
| 5,871,124 | A | 2/1999 | Wilkinson | |
| 5,873,495 | A | 2/1999 | Saint-Germain | |
| 5,944,033 | A | * 8/1999 | Robinson | 132/322 |
| 5,975,362 | A | 11/1999 | West | |
| 5,979,706 | A | * 11/1999 | Grussmark | 222/93 |
| 6,321,944 | B1 | * 11/2001 | Cetrangolo | 222/105 |

* cited by examiner

Primary Examiner—Lesley D. Morris  
Assistant Examiner—F. Nicolas  
(74) Attorney, Agent, or Firm—Frank J. McGue

(57) ABSTRACT

A dental center is disclosed which comprises, in combination, a dispenser body and a dispensing portion. The dispenser body has a wall bracket adapted to mount to a vertical surface. Extending in a horizontal plane from the wall bracket is a toothbrush holder having a plurality of holes positioned about the periphery thereof. Each of the plurality of holes is adapted to receive and releasably hold a toothbrush therein. The dispensing portion is mounted on the dispenser body and comprises, in combination, a toothpaste tube and a floss dispenser. The toothpaste tube and the floss tube are separable and replaceable.

15 Claims, 4 Drawing Sheets

DENTAL CENTER

TECHNICAL FIELD

This invention relates generally to the field of dental care in the home, and, more particularly, to a dental center for dispensing toothpaste and floss as well as allowing storage of toothbrushes.

BACKGROUND OF THE INVENTION

At present, the majority of individuals use toothpaste and floss for dental prophylaxis. Most toothpastes come in a squeezable tube wherein the user squeezes out the product onto a toothbrush. Over the years, these tubes have maintained the same basic format. As is well known, it is difficult to squeeze the proper amount out once the tube is well used. Further, pockets of toothpaste often remain in the tube which is lost when the tube is discarded. Further, such tubes often develop cracks due to fatigue caused by numerous squeezes which leads to leakage of the toothpaste through said cracks. Further, toothpaste tubes, particularly used tubes, are not aesthetically pleasing and result in an unsightly appearance when left on the bathroom counter.

In addition, good dental hygiene requires the use of floss to clean between the teeth. At present, dental floss is provided on a spool in a container having a cutting blade mounted thereon. The dental floss container is usually rather small and easily misplaced.

Thus, there is a need for a dental care device which eliminates the shortcomings of the prior art. Attempts have been made in the prior art to resolve these issues.

U.S. Pat. No. 5,975,362 entitled "Toothpaste Dispenser" which issued on Nov. 2, 1999 to West discloses a toothpaste container providing toothpaste, dental floss and a brush holder. The device can be adhesively mounted to a wall.

U.S. Pat. No. 3,072,297 entitled "Liquid Soap Dispenser" which issued on Jan. 8, 1963 to Lippman et al. show a soap dispenser wherein rotation of turning member 18 results in dispensing at valving means 28.

U.S. Pat. No. 5,873,495 entitled "Device For Dispensing Multi-Components From A Container" which issued on Feb. 23, 1999 to St. Germain discloses a device for dispensing multi-components from a container U.S. Pat. No. 4,122,983 entitled "Versatile Dispensing Dental Hygiene and Shaving Device" which issued on Oct. 31, 1978 to Jolly provides a dental device having a handle with dental floss located therein. The handle may be rotated, turning feed rod 14 and piston assembly D.

None of the known prior art disclose the combination set forth herein.

SUMMARY OF THE INVENTION

It is an object of this invention to provide a new toothpaste and floss dispensing device which is aesthetically pleasing.

It is an further object of this invention to provide a new toothpaste and floss dispensing device which dispenses the toothpaste without the need for squeezing same.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Referring more particularly to the drawings by characters of reference, FIGS. 1–5 disclose combinations of features which constitute the components of a dental center 10 of the present invention. In the presently preferred embodiment, dental center 10 comprises a dispenser body 12 and a dispensing portion 14 mounted thereon.

Figure 2:
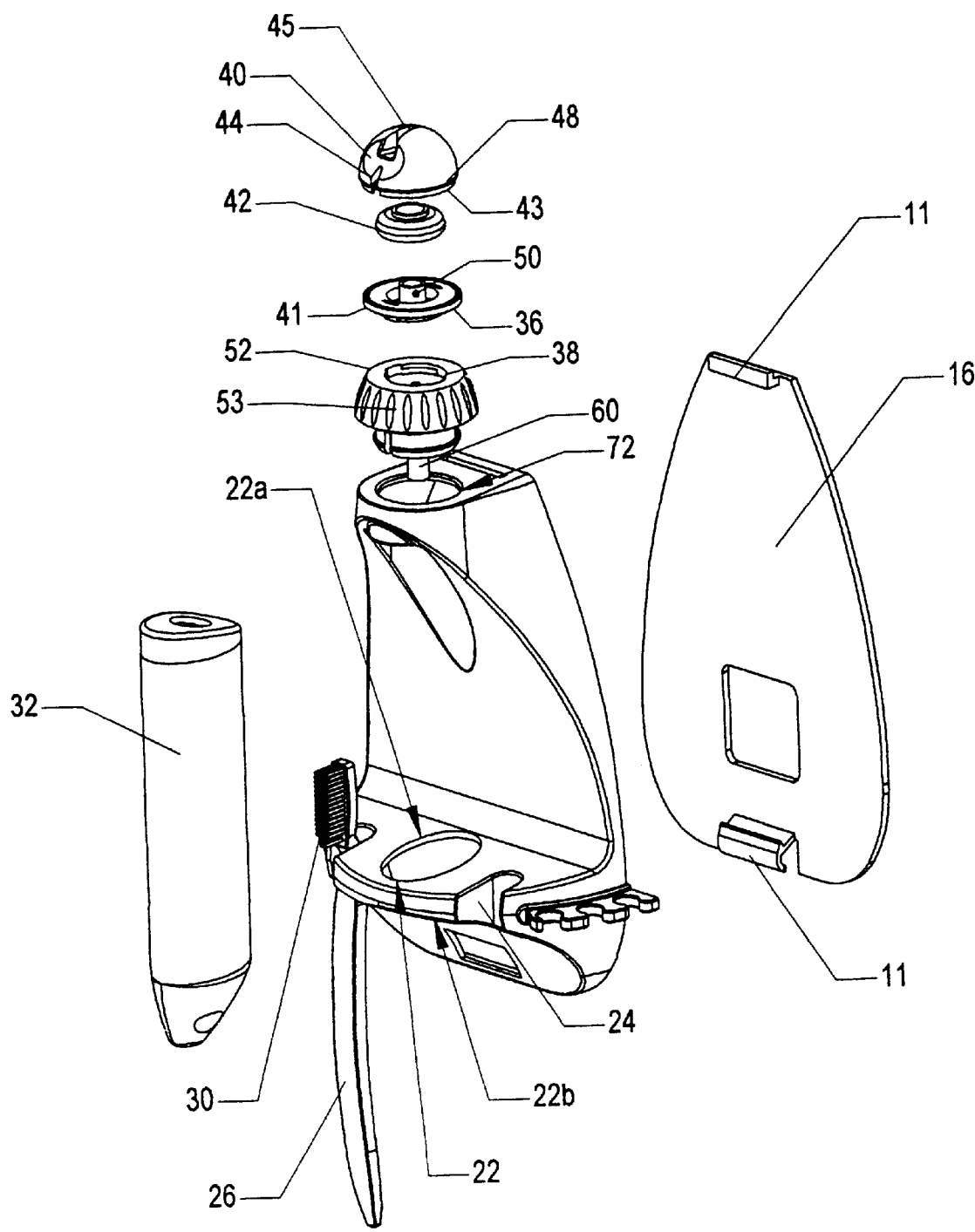
FIG. 2 is an exploded front and side perspective view of the present invention.
Figure 3:
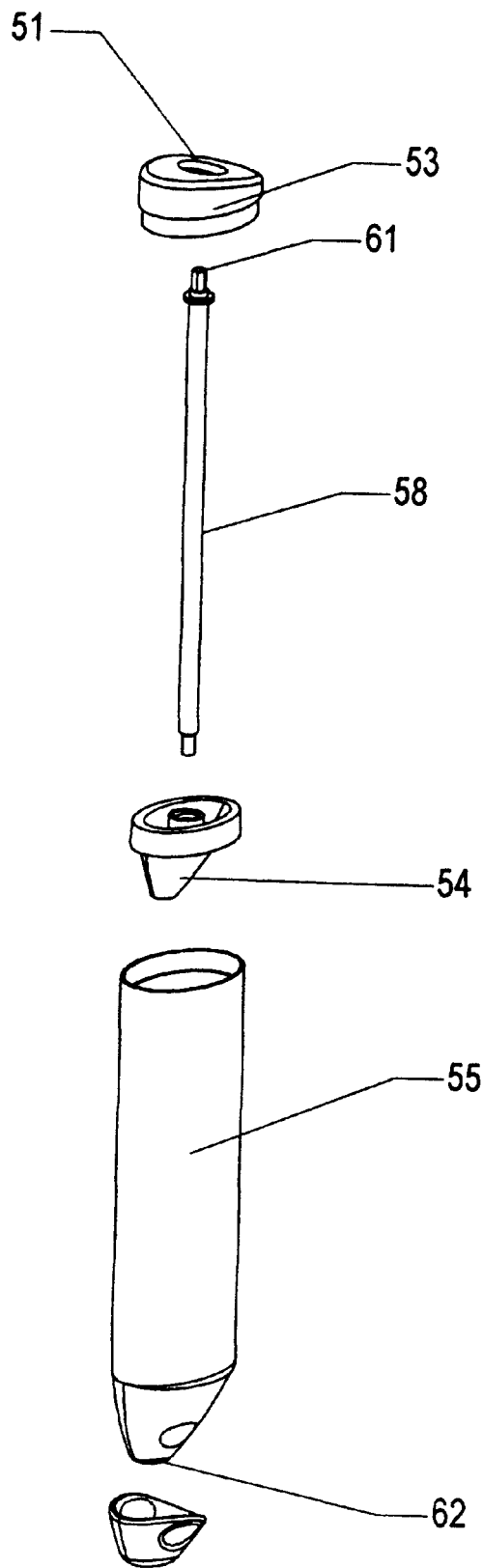
FIG. 3 is an exploded view of a dispensing portion employed in the present invention.
Figure 4:
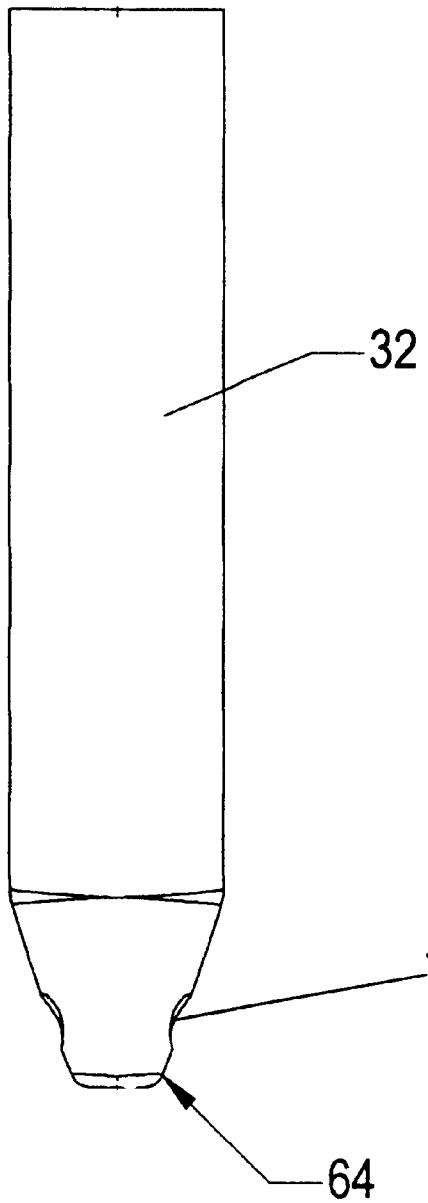
FIG. 4 is a side view of a toothpaste tube employed in the present invention.
Figure 5:
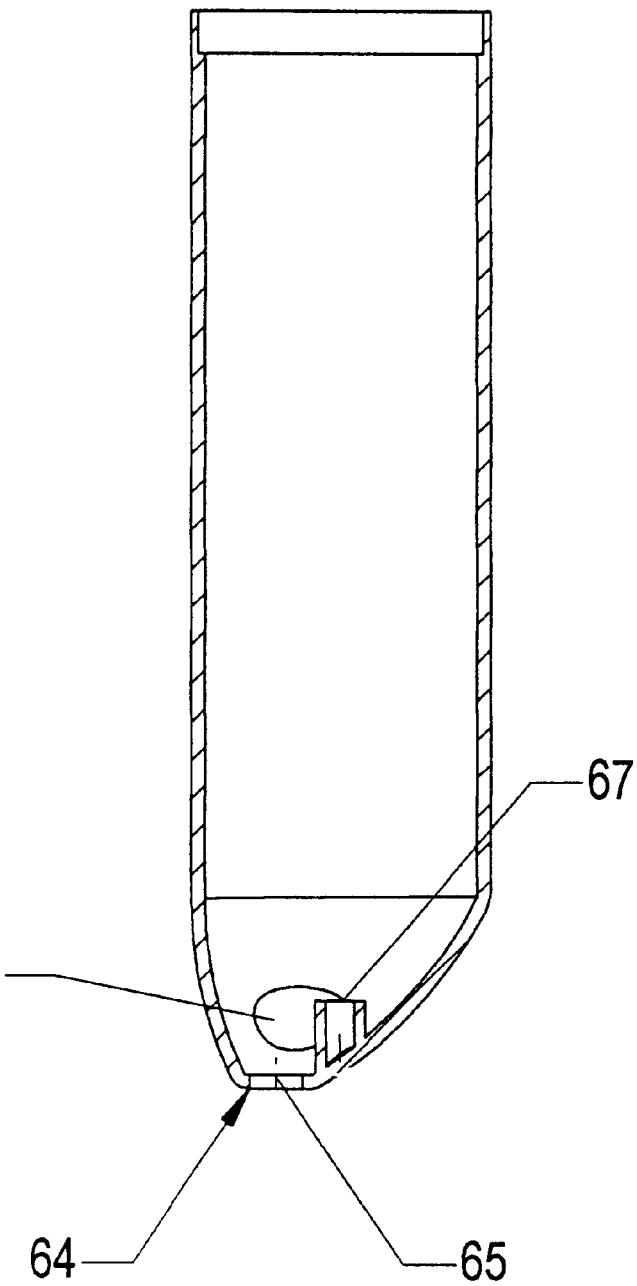
FIG. 5 is a cross sectional view taken along line 5—5 in FIG. 4.

As best seen in FIGS. 2, dispenser body 12 is attached via clips 11 to a wall bracket 16 which is affixed to a vertical surface. In one embodiment, an adhesive such as Command Adhesive® which is commercially available from 3M is employed. Alternatively, wall bracket 16 is attached via screws, mounting clips or many other methods well known to those skilled in the art.

Extending in a horizontal plane from dispenser body 12 is a base 20 having a tapered cavity 22 centered thereon. Cavity 22 supports dispensing portion 14 on the interior thereof as cavity 22 tapers from a wide top opening 22a to a narrower bottom opening 22b. The shape of tapered cavity 22 corresponds to the shape of a dispenser head 62 at the bottom of dispensing portion 14 which is described in more detail below. Also extending in a horizontal plane from dispenser body 12 is a second base 70 having a second cavity 72 extending therethrough. Cavity 72 provides lateral support for dispensing portion 14 which extends upwardly therethrough.

A plurality of toothbrush holding holes 24 are positioned on the periphery of base 20. Toothbrush holding holes 24 are large enough to receive a handle 26 of a toothbrush 28 but small enough to prevent a brush 30 from passing therethrough. In the illustrated embodiment, two toothbrush holding holes 24 are provided though those skilled in the art will recognize that number can be changed as desired. Further, a toothbrush holding bracket 25 having toothbrush holding holes 27 can be mounted to the side of dispenser body 12 if desired.

As best seen in FIGS. 2–5, dispensing portion 14 comprises a vertically oriented toothpaste tube 32 which is, preferably, a cylinder having a non circular, preferably, oval, cross section. The upper end of toothpaste tube 32 is adapted to receive knob 52 which, in turn, is adapted to receive a floss dispenser 34. In one embodiment, knob 52 receives floss dispenser 34 by quick disconnect fittings 36 and 38 on knob 52 and floss dispenser 34, respectively. In the presently preferred embodiment, the periphery of knob 52 is larger than that of cavity 72 whereby the edges of knob 52 rest on base 70 thereby providing support for dispensing portion 14. Removal of dispensing portion 14 from dispenser body 12 is accomplished simply by grasping knob 52 and lifting dispensing portion 14 from bases 20 and 70.

In the presently preferred embodiment, floss dispenser 34 includes a generally hemispherical cap 44 mounted atop a disk shaped bottom 41. Bottom 41 has a rotatable spool 50 containing floss 42 wound thereon extending upwardly therefrom. Floss dispenser 34 also preferably includes a window 40, or has cap 44 made of a transparent material thereby allowing the user to easily determine the amount of floss 42 contained therein. In addition, an opening 43 allows the free end of floss 42 to protrude from floss dispenser 34 and to be manually withdrawn therefrom. The exterior of floss dispenser 34 is further equipped with a cutting element 45 which allows the user to cut floss 42 to a desired length.

Once floss 42 is exhausted, it can be replaced easily. In the presently preferred embodiment, floss dispenser 34 is sold as a unit whereby changing dispensers 34 is accomplished simply by unscrewing quick disconnect fittings 36, 38 and removing the old dispenser 34 and screwing in a new dispenser 34. Snap fittings are also a viable option.

Turning now to toothpaste tube 32, initially, the interior thereof is filled with toothpaste. At the top of tube 32, a cap 53 has a hole 51 extending therethrough. Inside tube 32, a plunger 54 is rotatably engaging a jack screw 56. Upon rotation of jack screw 56 with respect to plunger 54, plunger 54 moves downwardly thereby pushing the toothpaste downwardly also. The periphery of plunger 54 engages the non-circular, preferably, oval, cross section of a sidewall 55 of toothpaste tube 32 and, in conjunction therewith, prevents leakage of toothpaste from around the edges of plunger 54 as it moves downwardly therein. Use of the non-circular cross section is indicated to allow plunger 54 to travel downwardly along jack screw 56. Note that the term non-circular includes, for example, a circular cross section with a vertical stop about the periphery to stop rotation of plunger 54 with jack screw 56.

Rotation of plunger 54 with respect to jack screw 56 is accomplished by turning knob 52 which is provided with a gripping surface 53 for ease of use. The rotation of knob 52 is transmitted to jack screw 56 via female fitting 60 which engages male fitting 61 positioned atop jack screw 56. Male fitting 61 extends through hole 51 to engage female fitting 60 on knob 52. The other end of jack screw 56 is rotatably engaged by jack screw rest 67 best seen in FIG. 5. Plunger 54 is frictionally engaged by sidewall 55 acting thereon and is prevented from rotating with respect to same due to the oval cross section thereof. Thus, when jack screw 56 rotates, plunger 54 travels downwardly therefrom to push the toothpaste out.

Figure 1:
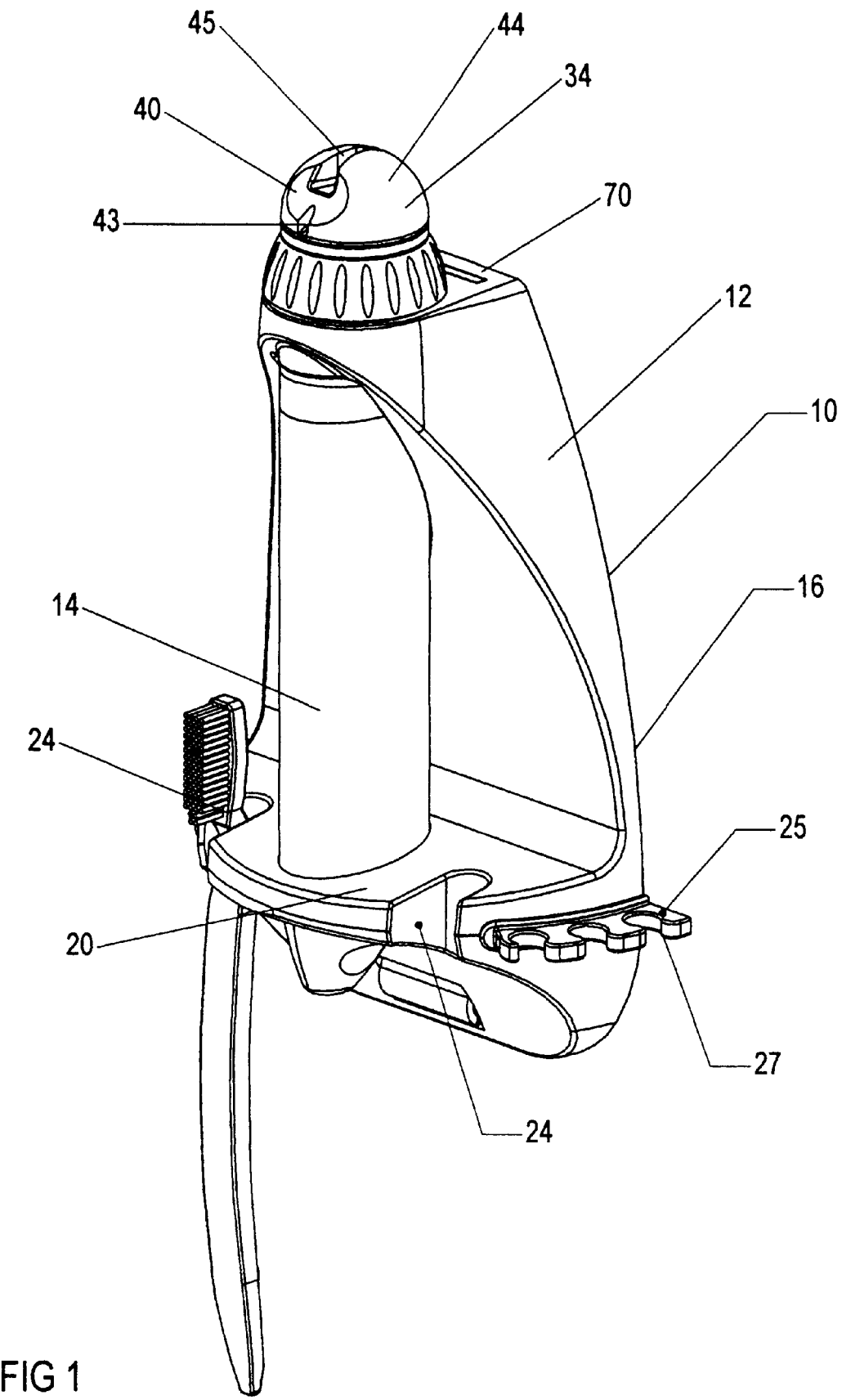
FIG. 1 is a perspective front and side view of the present invention.

The toothpaste is pushed from tube 32 into a dispensing head 62 which is generally tapered as previously discussed but includes a downwardly extending nipple 64. Nipple 64 includes a dispensing hole 65 which opens downwardly laterally therefrom for dispensing toothpaste from tube 32 onto toothbrush 28 as best seen in FIG. 1. Plunger 54 pushes the toothpaste from tube 32 into dispensing head 62 and into nipple 64 and finally out dispensing hole 65 for the user.

Toothpaste tube 32 is preferably made of a transparent material to allow a user to easily determine the amount of toothpaste contained therein. Alternatively, a toothpaste window 70 is preferably provided proximate to the bottom of toothpaste tube 32 to allow a user to easily determine the amount of toothpaste remaining. Replacement of toothpaste tube 32 when the toothpaste is exhausted is preferably accomplished by either simply purchasing toothpaste tube 32 in combination with dispensing head 62. In this instance the exhausted tube 32 and dispensing head 62 combination detached from cavity 22 by simply lifting from knob 52. Floss dispenser 34 stays on knob 52. Then, the new tube 32 and dispensing head 62 is simply dropped into cavity 22 as previously described. In this embodiment, dispensing head 62 and tube 32 are provided as an integrated unit thereby eliminating the need for threadings.

Although only certain embodiments have been illustrated and described, it will be apparent to those skilled in the art that various changes and modifications may be made therein without departing from the spirit of the invention or from the scope of the appended claims.

What is claimed is:

1. A dental center comprises, in combination:

a dispenser body having a wall bracket adapted to mount to a vertical surface, the dispenser body further having a toothbrush holder base in a horizontal plane from the wall bracket, the base having a plurality of holes positioned about the periphery thereof, each of the plurality of holes adapted to receive and releasably hold a toothbrush therein, the base including a tapered cavity extending therethrough, the dispenser body further having a second base extending in a horizontal plane from the wall bracket above the base, the second base having a second cavity extending therethrough aligned with the tapered cavity, a dispensing portion adapted to mate with and be supported by the tapered cavity, the dispensing portion extending through the second cavity which provides lateral support for the dispensing portion, the dispensing portion comprising, in combination, a toothpaste tube and a floss dispenser, the toothpaste tube and the floss dispenser being separable and individually replaceable.

2. The dental center of claim 1 wherein the wall bracket is mounted to a vertical surface using an adhesive.

3. The dental center of claim 2 wherein the adhesive is strong enough to hold the dental center onto a vertical surface and is removable therefrom.

4. A dental center comprises, in combination:

a dispenser body having a wall bracket adapted to mount to a vertical surface, the dispenser body further having a toothbrush holder base in a horizontal plane from the wall bracket, the base having a plurality of holes positioned about the periphery thereof, each of the plurality of holes adapted to receive and releasably hold a toothbrush therein, a dispensing portion mounted on the dispenser body, the dispensing portion comprising, in combination, a toothpaste tube and a floss dispenser, the toothpaste tube and the floss dispenser being separable and replaceable, the floss dispenser being mounted to the top of the toothpaste tube by quick disconnect fittings, the toothpaste tube comprising a vertically oriented open ended cylinder having a non-circular cross section containing a quantity of toothpaste, the lower end having a dispensing head, the dispensing head having an opening to the interior of the toothpaste tube.

5. The dental center of claim 4 wherein the floss dispenser includes a hemispherical cap and further includes a window thereby allowing the user to visually inspect the amount floss contained therein.

6. The dental center of claim 4 wherein the floss dispenser includes an opening adapted to allow a free end of the floss to protrude from the floss dispenser and to be manually withdrawn therefrom, the exterior of the floss dispenser further having a cutting element for severing the floss to desired lengths.

7. The dental center of claim 4 wherein the toothpaste tube includes a jack screw centered on the long axis of the open ended cylinder, the jack screw engaging a plunger, the plunger extending completely from the jack screw to a sidewall of the cylinder, the toothpaste tube further having means for rotating the jack screw and thereby causing the plunger to move vertically within the open ended cylinder thereby pushing the toothpaste contained therein through the opening of the dispensing head.

8. The dental center of claim 7 wherein a periphery of the plunger engages the sidewall, the periphery of the sidewall having an oval cross section.

9. The dental center of claim 7 wherein the rotating means comprises a rotatable knob mounted between the top of the toothpaste tube and the floss dispenser, the jack screw extending through the top and engaging the knob whereby rotation of the knob is transmitted to the jack screw.

10. The dental center of claim 7 wherein the dispensing head comprises a tapered portion extending downwardly from the toothpaste tube and engaging the tapered cavity, the dispensing head further having a nipple extending downwardly therefrom, the nipple having the opening thereon, the opening extending downwardly from the nipple.

11. The dental center of claim 4 wherein the toothpaste tube has a toothpaste window provided proximate to the bottom of the toothpaste tube, the toothpaste window allowing visual inspection of the contents of the toothpaste tube.

12. The dental center of claim 4 wherein the dispensing head is detachable from the toothpaste tube.

13. A dental center comprises, in combination:
a dispenser body having a wall bracket adapted to mount to a vertical surface, the dispenser body further having a base extending in a horizontal plane from the wall bracket, the toothbrush holder having a plurality of holes positioned about the periphery thereof, each of the plurality of holes adapted to receive and releasably hold a toothbrush therein, the dispenser body including a cavity extending therethrough, a dispensing portion mating with the cavity for supporting the dispensing portion therein, the dispensing portion comprising, in combination, a toothpaste tube and a floss dispenser, the toothpaste tube and the floss dispenser being separable and replaceable, the toothpaste tube comprising a vertically oriented open ended cylinder having a non-circular cross section containing a quantity of toothpaste, the upper end of the toothpaste tube adapted to mount the floss dispenser thereon, the lower end having a dispensing head having an opening to the interior of the toothpaste tube, the toothpaste tube including a jack screw centered on the long axis of the open ended cylinder, the jack screw engaging a plunger, the plunger extending completely from the jack screw to the sidewall of the cylinder, the plunger contacting the sidewall to prevent leakage of the toothpaste between the sidewall and the periphery, the toothpaste tube further having a rotatable knob mounted between the toothpaste tube and the floss dispenser, the knob rotatably engaging the jack screw whereby rotation of the knob is transmitted to the jack screw thereby causing the plunger to move vertically within the open ended cylinder to push the toothpaste contained therein through the opening of the dispensing head, the dispensing head comprising a tapered portion extending downwardly from the toothpaste tube and engaging the tapered cavity and a nipple extending downwardly therefrom, the nipple having the opening thereon, the opening extending downwardly from the nipple, the toothpaste tube adapted to allow visual inspection of the contents of the thereof, the floss dispenser having a hemispherical cap and further adapted to allow visual inspection of the floss contained therein, the floss dispenser including an opening adapted to allow the free end of the floss to protrude from the floss dispenser and to be manually withdrawn therefrom, the exterior of the floss dispenser further having a cutting element for severing the floss to desired lengths.

14. The dental center of claim 13 wherein floss dispenser is mounted to the knob by quick disconnect fittings.

15. The dental center of claim 13 wherein the dispensing head is detachable from the toothpaste tube.

* * * * *